United States Patent [19]

Nakatani et al.

[11] Patent Number: 5,720,663
[45] Date of Patent: Feb. 24, 1998

[54] GAME APPARATUS, IMAGE SYNTHESIZING METHOD, AND DATA STORAGE MEDIUM

[75] Inventors: Hajime Nakatani, Yokohama; Masamichi Abe, Tokyo; Yutaka Konoe, Yokohama; Yoshihito Saito, Machida, all of Japan

[73] Assignee: Namco Ltd., Tokyo, Japan

[21] Appl. No.: 566,142

[22] Filed: Dec. 1, 1995

[30] Foreign Application Priority Data

Dec. 2, 1994 [JP] Japan .................... 6-329397
Sep. 1, 1995 [JP] Japan .................... 7-248787

[51] Int. Cl.$^6$ .................................. A63F 9/22
[52] U.S. Cl. .................................. 463/23
[58] Field of Search ................. 463/23, 25, 43, 463/44, 36, 37, 38; 273/459, 460, 461

[56] References Cited

U.S. PATENT DOCUMENTS 4,657,247  4/1987  Okada .................... 463/23
4,685,677  8/1987  Demar et al. .............. 463/23

FOREIGN PATENT DOCUMENTS 7-98104  10/1995  Japan.
7-98105  10/1995  Japan.
7-98106  10/1995  Japan.

*Primary Examiner*—George Manuel
*Attorney, Agent, or Firm*—Oliff & Berridge

[57] ABSTRACT

An information storage device stores number-of-times-played information, total-playing-time information, and game-setting information, so that this information is retained after a games machine has been switched off. A game computation section performs game computations on the basis of manipulation information from the manipulation section, game-setting information that is stored in the information storage device, and a given program. An image synthesis section synthesizes a game image on the basis of results of these game computations. When a power detection section detects that power has been turned on, a read section reads information from the information storage device, then an information updating section updates the number-of-times-played information and total-playing-time information each time the game is played and also updates the game-setting information when the number of times played or the like exceeds a given number. After a given period of time has elapsed, a new game character appears for the player to select.

38 Claims, 13 Drawing Sheets

GAME APPARATUS, IMAGE SYNTHESIZING METHOD, AND DATA STORAGE MEDIUM

BACKGROUND OF THE INVENTION

Field of the Invention

This invention relates to a game apparatus, an image synthesizing method, and a data storage medium.

It has long been known to provide a games machine with an information storage device such as an EEPROM that retains information after power is turned off. With such a games machine, information that players and operators do not want to be lost when the machine is switched off is stored in the information storage device. This information includes high scores, the names of players who achieved these high scores, information that facilitates the setting of the games machine, and data-acquisition information.

However, the information stored in the information storage device of such a games machine does not have any effect on the game scene or on the game production in the prior art. Thus it can not greatly contribute to increasing the fascination of the game.

One kind of games machine that is well known is a combat type of games machine with which a player selects a game character (or moving body such as a tank) 230 or 232, as shown in FIG. 13A, and manipulates that game character 230 or 232 while viewing a game scene such as that shown in FIG. 13B to battle against other game characters. More than one player can play at the same time, so that two players can "fight" each other via this games machine. This kind of games machine is extremely popular because a player manipulating one of these game characters can begin to feel as if he or she is really in this scene, using these combative techniques.

Unfortunately, the numbers and/or types of game characters that players can select in this combat type of games machine are fixed, and the skills exhibited by these game characters are also fixed for each character. This means that it is not possible to further increase the fascination of such a game, and such a games machine is likely to become boring when it is installed at a site such as a games center for a long time, which leads to a problem in that its operation rate (the average number of time played that have been played for a given period of time) is likely to fall.

SUMMARY OF THE INVENTION

The present invention was devised in order to solve the above problems. One objective of this invention is to provide a games machine, an image synthesis method, and an information storage medium that make it possible for information that is stored in an information storage device to affect the game, thus increasing the fascination of the game.

Another objective of this invention is to provide a games machine, an image synthesis method, and an information storage medium that ensure that the player of a combat type of games machine is not likely to become bored of the game, thus ensuring that the game will remain popular for a long time.

In order to solve the above described problems, a first aspect of this invention concerns a games machine that comprises an information storage device for storing information consisting of at least number-of-times-played information (information relating to the number of times a player has played this game) and game-setting information, and also retaining this information after power is turned off; a manipulation means for enabling a player to interact with the game; a game computation means for performing game computations on the basis of manipulation information from the manipulation means, the game-setting information stored in the information storage device, and a given program; and an image synthesis means for synthesizing an image that can be seen by the player, on the basis of game computation results by the game computation means; wherein: the game computation means comprises means for reading the information from the information storage device, information updating means for updating the number-of-times-played information within the information every time the game is played and also updating the game-setting information when number of times played exceeds a given number, and means for writing the thus updated information to the information storage device.

With this aspect of the invention, information is read out from the information storage device and the number-of-times-played information within this information is updated every time this game is played. When the number of times played exceeds a given number, the game-setting information is also updated. Thus game computations can be based on this updated game-setting information, enabling modification of the game scene or the settings of this game. During this time, the updated information is written to the information storage device so that it is retained even when the games machine is turned off. This aspect of the invention makes it possible to implement a games machine that is not likely to become boring, even when it is used for a long time. When this invention is applied to a public games machine, it also enables an increase in the operation rate of the games machine.

In a second aspect of this invention, updating of information such as the game-setting information is based on total-playing-time information, not the number-of-times-played information. This makes it possible to supply a games machine that is not likely to become boring, by modifying the game scene or the settings of the game when the total playing time exceeds a given length of time.

Note that the games machine of this invention may comprise a power detection means that detects when power is turned on and off. The configuration could be such that the read means reads information from the information storage device when the power detection means detects that power has been turned on, or thereafter, and the write means finishes writing information to this information storage device at the stage at which the power detection means detects that power has been turned off. This ensures that updated information can be stored reliably in the information storage device during the period in which the games machine is switched on, and also that the game computations can be done reliably on the basis of this updated information the next time that power is turned on.

In accordance with a third aspect of this invention, the game computation means performs game computations for implementing combat between a game character or moving body that is manipulated by the player and at least one game character or moving body that is manipulated by one of another player and a computer; and information about the game character or moving body that the player can select within the game are changed by updating the game-setting information by the information updating means.

With this aspect of the invention, information relating to details such as the game characters that can be selected, such as the numbers and/or types of game characters that the player can select, can be modified by updating the game-setting information when the number of times played exceeds a given number or the total playing time exceeds a given length of time. Subsequent game computations are done on the basis of this modified information. This makes it possible to implement a games machine that will not become boring, by ensuring that players will go on playing this game in order to see these new game characters.

In this case, information relating to combat by this game character or moving body could be changed by this updating of the game-setting information by the information updating means. Therefore, information relating to combat by a game character, such as his or her attack methods, can be modified by updating the game-setting information and thus the character can be made to exhibit characteristic techniques. This means that a player wanting to use new attack methods will keep on playing the game, ensuring the games machine is unlikely to become boring.

With a fourth aspect of this invention, this number-of-times-played information or total-playing-time information is displayed either for a given period of time or continuously on the game screen.

With this aspect of the invention, the number-of-times-played information or total-playing-time information is either displayed on the game screen during a given period of time such as the start of the game, during the game, or after the game has ended, or it is displayed continuously. This enables the player to check the current number of times played or total playing time. Thus, if the number of times played is close to the given value or the total playing time is close to the given length of time, the player can keep on playing the game until the given value or length of time is reached, making it possible to implement a games machine that is not likely to become boring. Note that the number-of-times-played information or total-playing-time information that is displayed could be equivalent to the number of times played or total playing time.

A fifth aspect of this invention concerns a games machine comprising a manipulation means for enabling a player to interact with a game; a game computation means for performing game computations for implementing combat between a game character or moving body that is manipulated by the player and at least one game character or moving body that is manipulated by one of another player and a computer, on the basis of at least manipulation information from the manipulation means and a given program; an image synthesis means for synthesizing an image that can be seen by the player, on the basis of game computation results of the game computation means; wherein the games machine further comprises means for causing an increase in the number of game characters or moving bodies that the player can select within the game when a given period of time has elapsed.

With this aspect of the invention, the system determines the passing of a given period of time on the basis of a parameter such as the time during which the games machine has been on, the total playing time, or the number of times played, and increases the number of game characters displayed on a game character selection screen when this given period of time has elapsed. This makes it possible to increase the selection range of game characters for the player, thus enabling a games machine that is less likely to become boring. This aspect of the invention is particularly advantageous because the timing at which game characters appear can be controlled by controlling the length of this given period of time. This makes it possible to ensure that new game characters appear at about the time that players are likely to become bored with the games machine, thus ensuring that the game remains fascinating for a long time. Note that a newly appearing game character could correspond to an existing game character that has been available from the start, or it could be completely unrelated to previous characters.

A sixth aspect of this invention further comprises means for changing at least one of the game characters or moving bodies that the player can select within the game, when a given period of time has elapsed, changed game character or moving body having actions in response to game manipulations that are at least partially different from those of the at east one game character or moving body.

With this aspect of the invention, an existing game character is changed to a new game character when a given period of time has elapsed. In this case, the new game character has actions in response to the game manipulations that are at least partially different from those of the previous game character, such as a different type of skill or a difference in speed. Therefore, after a given period of time has elapsed, the player is able to manipulate a new game character having skills different from those of the existing game character, thus making it possible to maintain the fascination of the games machine over a longer period.

A seventh aspect of this invention is provided with a timer means for measuring the passage of time; means for causing an increase in the number of game characters or moving bodies that the player can select within the game, when it is determined by the time measurement performed by the timer means that a given period of time has elapsed or a given point of time has been reached, or means for changing at least one of the game characters or moving bodies that the player can select within the game, changed game character or moving body having actions in response to the game manipulations that are at least partially different from those of the at least one game character or moving body.

With this aspect of the invention, the use of a timer means makes it possible to accurately measure a given period of time or determine a given point of time, so that the timing at which a new game character appears can be controlled precisely. By setting the games machine in such a manner that a new game character appears when a given point of time is reached, an announcement effect can be used to further increase the popularity of that games machine.

In an eighth aspect of this invention, the priority of appearance of a new game character caused by the above increase in the number of game characters or moving bodies or the above change of a game character or moving body is determined on the basis of the usage frequency of an existing game character or existing moving body that corresponds to the new game character or new moving body.

With this aspect of the invention, it is possible to ensure that the next new game character to appear corresponds to the existing game character with the greatest usage frequency, or, alternatively, to the existing game character with the lowest usage frequency. This means that new game characters can be made to appear in a sequence that agrees with the wishes of the majority of players, or, alternatively, that the appeal of the game characters can be made more uniform.

In a ninth aspect of this invention, information for identifying a new game character or new moving body that has appeared as a result of the increase in the number or as a result of the change of game characters or moving bodies is displayed during a period during which no player is playing the game.

With this aspect of the invention, identification information concerning the new game character is displayed while no-one is playing the game, such as in the title sequence, a demo sequence, or while the high-score ranking image is displayed. This makes is possible to inform players that the games machine has a new game character that can be selected. As a result, the popularity of the games machine can be maintained for a long time.

BRIEF DESCRIPTION OF THE DRAWINGS

FIG. 8 is a block diagram illustrative of the operations when the number or type of game characters is changed on the basis of number of times played, total playing time, or the time during which the games machine has been on;

DETAILED DESCRIPTION OF PREFERRED EMBODIMENT

A preferred embodiment of this invention will be described in detail below with reference to the accompanying drawings.

1. Configuration

Figure 1:
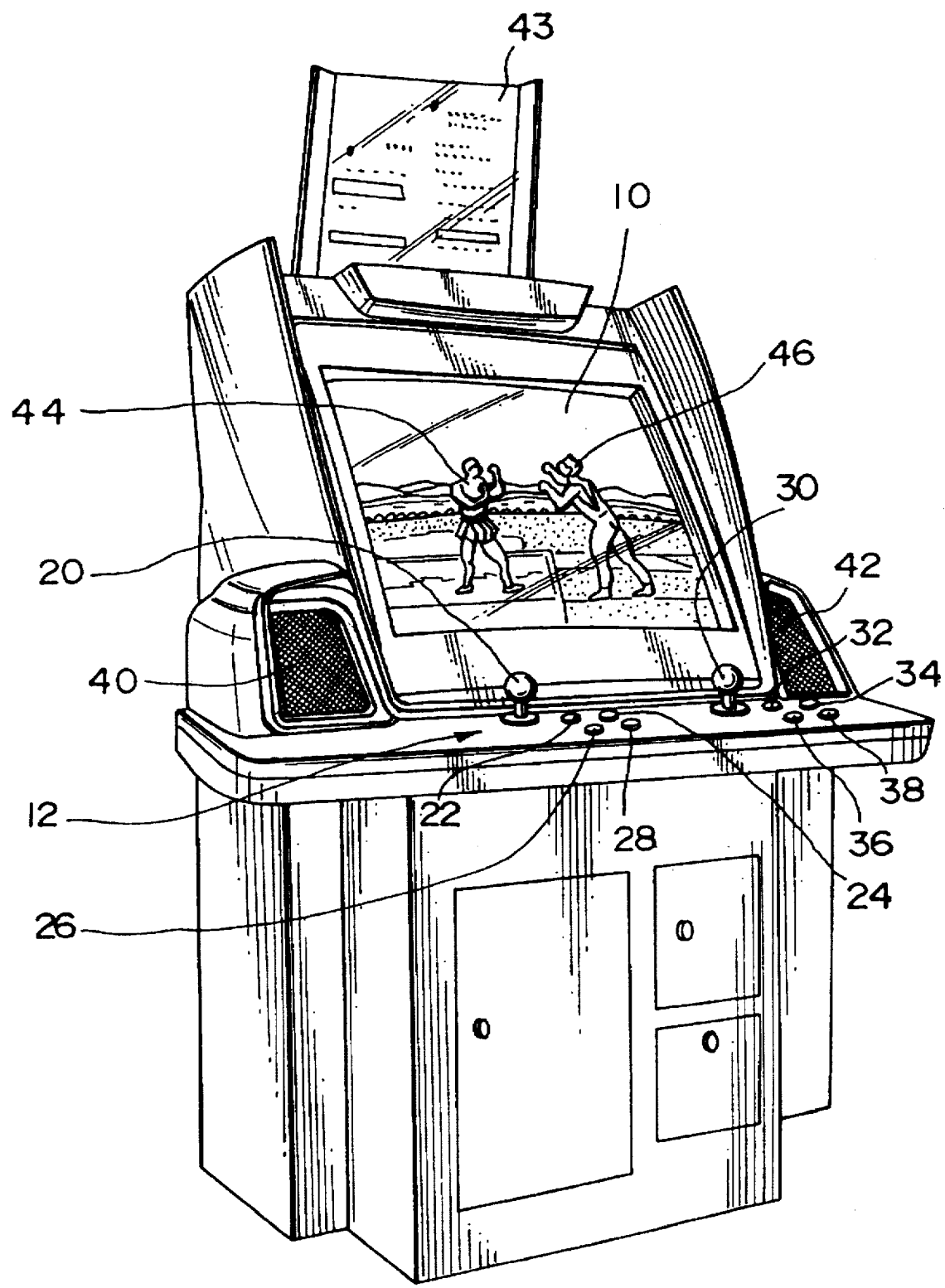
FIG. 1 shows the overall configuration of a games machine in accordance with an embodiment of this invention.

The overall configuration of the games machine of this embodiment is shown in FIG. 1. This figure shows a combat type of games machine that is installed at a public site such as a games center.

The games machine of FIG. 1 is provided with a display 10 that shows a game scene, a manipulation section 12 that allows a player to manipulate the game, and speakers 40 and 42 that output game sounds. The player can see game characters 44 and 46 displayed on the display 10, while listening to game sounds that are output from the speakers 40 and 42. The player can also enjoy participating in this combat type of game by using the manipulation section 12 to manipulate the game characters 44 and 46.

The manipulation section 12 is provided with a lever 20 and buttons 22, 24, 26 and 28 for a first player and a lever 30 and buttons 32, 34, 36 and 38 for a second player. These levers and buttons are used as means of specifying actions of the game characters. It should be noted, however, that if only one player is to play this game, this first player combats a game character that is manipulated by a computer, not a second player.

In this embodiment, each of the game characters 44 and 46 can be made to move to the left or right along a connecting line by moving the lever 20 or 30 corresponding to that game character 44 or 46 to the left or right. Each of the game characters 44 and 46 can also be made to jump or crouch down, by moving the corresponding lever 20 or 30 up or down. In addition, in this embodiment the first player can make the game character 44 move the left hand, right hand, left leg, or right leg, by pressing a left hand button 22, right hand button 24, left leg button 26, or right leg button 28 as appropriate. The buttons 32, 34, 36 and 38 are allocated in a similar manner to the other game character 46.

Figure 2:
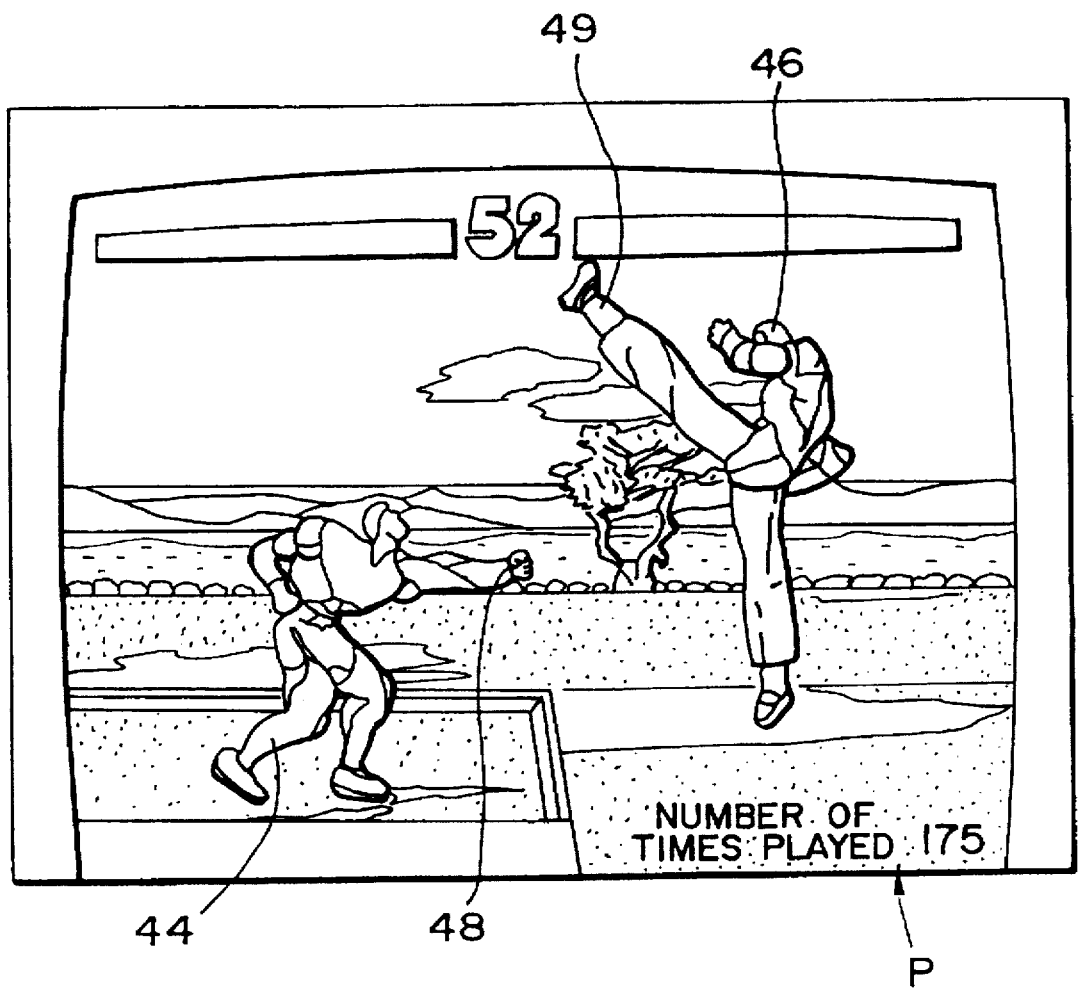
FIG. 2 shows an example of the game image synthesized by this embodiment.

An example of the game scene that is produced by the games machine of this embodiment is shown in FIG. 2. In this game scene, the first player is making the game character 44 attack with his left hand 48 by moving the lever 20 downward and pressing the left hand button 22. At the same time, the second player is making the game character 46 attack with his left leg 49 by pressing the left leg button 36.

Figure 3:
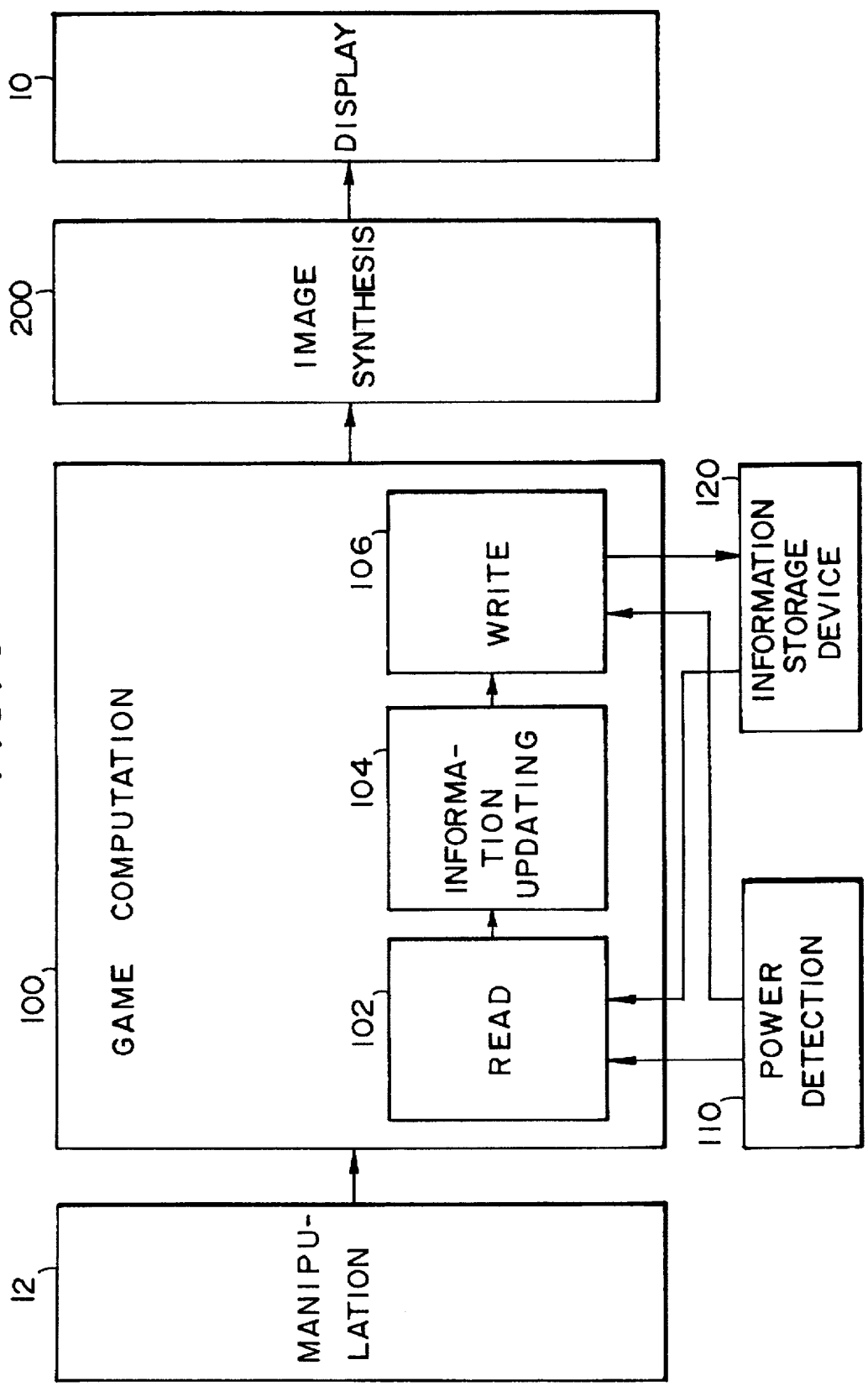
FIG. 3 is a functional block diagram of the basic configuration of this embodiment.

An example of a functional block diagram of the configuration of this embodiment is shown in FIG. 3. This games machine comprises the manipulation section 12 through which the player inputs operating signals, a game computation section 100 that performs game computations, an image synthesis section 200 that synthesizes a game image, the display 10 that shows the game image, a power detection section 110 that detects that a power source is connected, and an information storage device 120 that stores information.

The manipulation section 12 comprises the levers 20 and 30, buttons 22, 24, 26 and 28, and buttons 32, 34, 36 and 38 shown in FIG. 1, and it transfers to the game computation section 100 manipulation information that specifies the movements of the game characters.

The game computation section 100 performs game computations on the basis of the manipulation information from the manipulation section 12, a game program, and game-setting information that is stored in the information storage device 120, and it comprises a read section 102, an information updating section 104, and a write section 106. The image synthesis section 200 synthesizes the game image to be seen by the player, on the basis of game computation results produced by the game computation section 100.

The power detection section 110 detects which the power to the games machine is turned on and off, and a detection result is output therefrom to the read-out section 102 and write section 106 in the game computation section 100. The information storage device 120 stores information that includes information on the number of times played that have been played (or information on the total time that the game has been played) and game-setting information, and it is configured of a form of memory that can save this information when the power is off, and also overwrite such information, such as an EEPROM.

The read section 102 reads information from the information storage device 120 at a suitable time, such as when the power detection section 110 has detected that power has been turned on, or thereafter, and outputs the thus-read information to the information updating section 104. Every time this game is played, the information updating section 104 updates the number-of-times-played information within the thus-read information and also, if this number of times played exceeds a given number, updates the game-setting information within the thus-read information. The write section 106 writes the updated information to the information storage device 120 at as suitable time, such as when power-off has been detected by the power detection section 110. It should be noted that this read operation of the read section 102 and the write operation of the write section 106 need not necessarily be based on the power on/off detections of the power detection section 110.

2. Operation

The operation of this embodiment will now be described with reference to the flowchart of FIG. 4. First of all, in a step S1, the turning on of the power is detected by the power detection section 110, then, in a step S2, number-of-times-played information N and game-setting information X are read from the information storage device 120 by the read section 102.

Game computations are then performed in accordance with the thus-read game-setting information, manipulation information from the manipulation section 12, and a given program. In other words, trees and other pieces of scenery for the game scene shown in FIG. 2 are arranged and computations for drawing the background are performed. If a player has manipulated one of the game characters 44 and 46 by a lever or button, computations for moving that game character 44 or 46 are also performed. If, for example, this device is a 3D games machine that is capable of creating 3D images, each part of the game character 44 or 46, such as a hand or foot, is represented by a collection of objects (although a game character could be represented by a single object), and each object is represented by a collection of polygons. In such a case, the game computation section 100 performs computations to determine the position and orientation of each object and outputs object information, which is information relating to this position and orientation, to the image synthesis section 200. The image synthesis section 200 renders an image as seen from a given viewpoint and line-of-sight direction, on the basis of this object information. More specifically, this image processing locates an object based on object information within a virtual 3D space that is expressed by a world coordinate system, converts these coordinates to a view coordinate system and screen coordinate system, then paints the polygons thereof with given colors. Thus the game image shown in FIG. 2 is obtained.

In this manner, a sequence of game images is created for each field, until the game ends when a given period of time has elapsed or when one of the game characters has been defeated (step S3). The number-of-times-played information N is thereupon updated by being incremented by 1, so that it becomes N+1, in a step S4. This updating is done by the information updating section 104. The updated number-of-times-played information N is then written by the write section 106 to the information storage device 120 for storage in a step S5. This overwriting of the information could equally well be done all together when the power detection section 110 detects that the games machine has been turned off.

The system then determines whether or not the number of times played N exceeds a given number A, in a step S6. If N exceeds A, the flow proceeds to a step S7 in which the game-setting information X is updated by incrementing it to X+1, for example. This updating is done by the information updating section 104 and the thus updated game-setting information is written by the write section 106 to the information storage device 120 for storage, in a step S8. This overwriting could also be done all together when the power detection section 110 detects that the games machine has been turned off.

The above procedure continues to update the game-setting information (which contains parameters for setting the game) every time the number of times played exceeds a given number.

Figure 4:
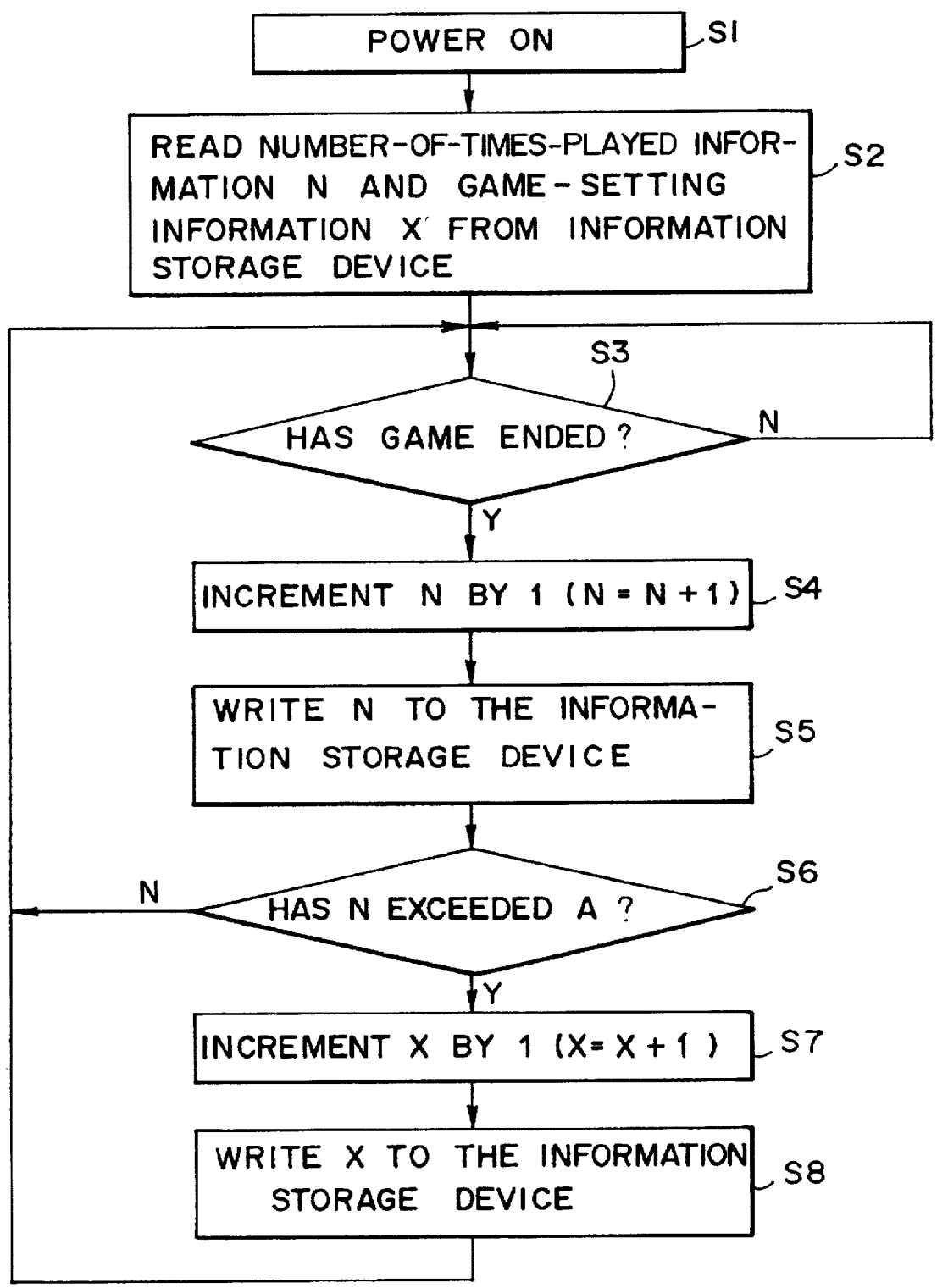
FIG. 4 is a flowchart of the basic operation of this embodiment.
Figure 5:
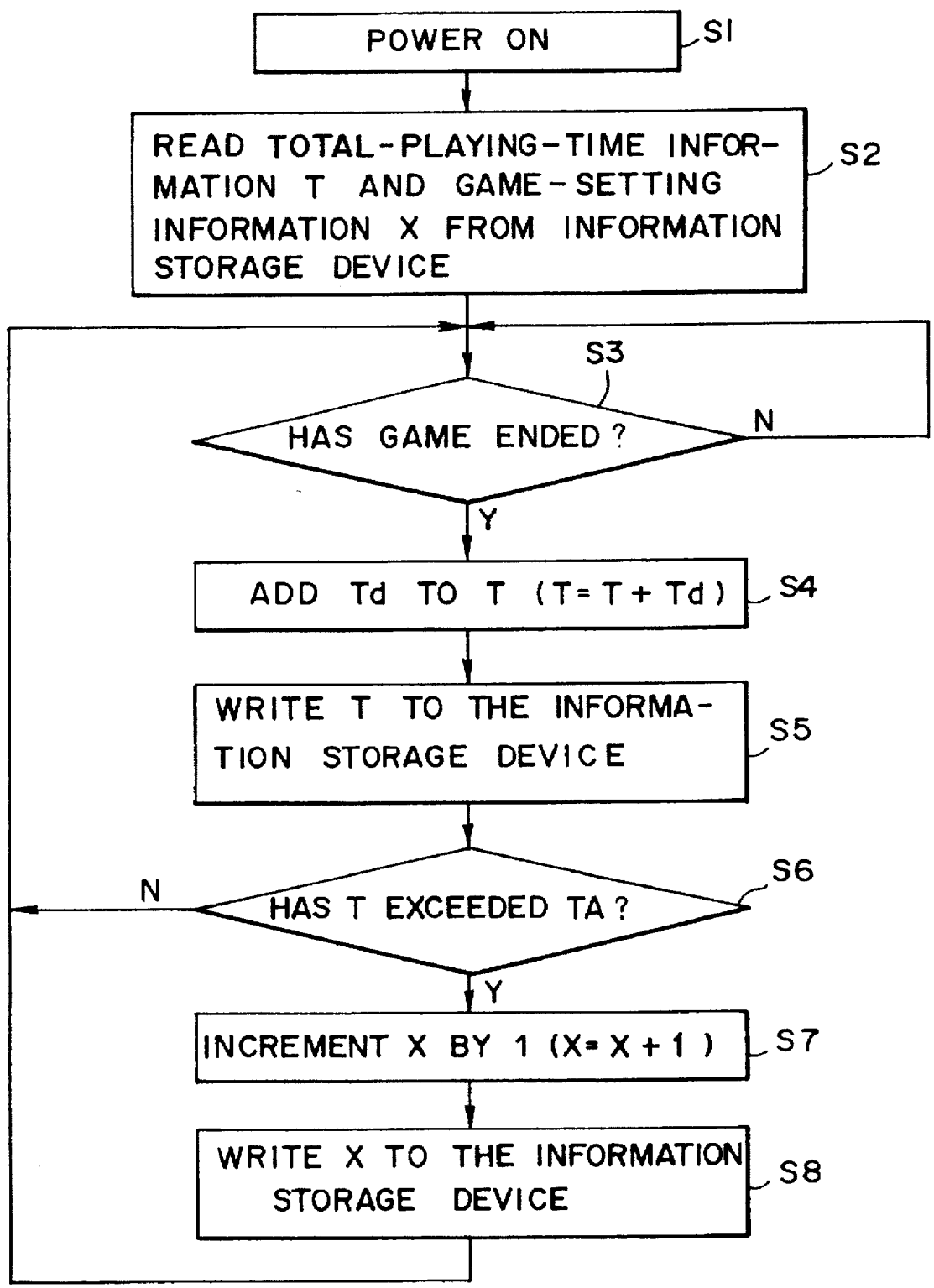
FIG. 5 is another flowchart of the basic operation of this embodiment.

The flowchart of a similar procedure for updating the game-setting information on the basis of total-playing-time information is shown in FIG. 5. This procedure differs from that shown in FIG. 4 in that total-playing-time information T (information on the total time that the game has been played) is stored in the information storage device 120 and this is read out in step S2. After the game ends in step S3, the time Td taken to play that game is added to T in step S4, this updated total playing time f is stored in the information storage device 120 in step S5, and T is compared with a given length of time TA in step S6.

In the flowcharts of FIGS. 4 and 5, it is determined whether or not a given time has been exceeded on the basis of either number-of-times-played information or total-playing-time information, and the game-setting information is updated accordingly. In other words, the given period of time is assumed to have elapsed and the game-setting information is updated when the number of times played exceeds a given number or the total playing time exceeds a given length of time. This method has advantages over a method that measures the time during which the games machine has been on, and determines that a given period of time has been exceeded on the basis of this time, as described below. With a method based on the time during which the games machine has been on, this time elapses regardless of the number of times played of the game played by players. Therefore, if the change of game scene is based on this time during which the games machine has been on, it is comparatively difficult to arouse a feeling in players of wanting to see a changed scene and thus induce a player to insert another coin. On the other hand, with a method of updating game-setting information that uses the number of times played or the total playing time, the prospect of a new game setting can induce a feeling of anticipation in players so that they keep playing this game. This makes it easier to increase the operation rate of the games machine.

3. Updating of Game-Setting Information

Figure 6:
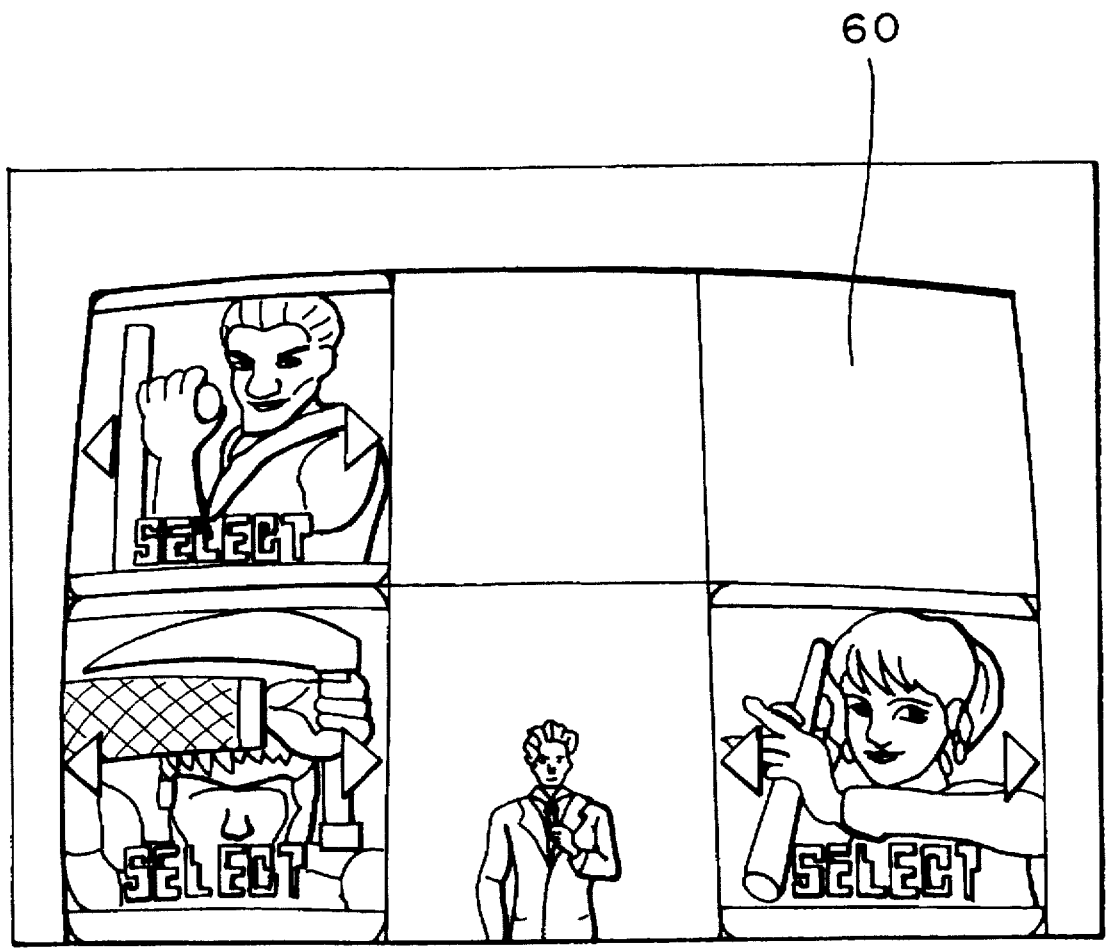
FIG. 6 shows an example of a game image created by this embodiment.

The way in which game-setting information is updated will now be described. In this embodiment, information concerning the game characters that the player can select for this game is changed by updating the game-setting information. This process can be used to add extra features to the game, such as allow the player to select a game character who was not available before the game-setting information was updated. For example, assume that a certain game character is omitted from a character selection region 60 of FIG. 6, so that the player can select a game from only three game characters. In this case, only the character selection region 60 shown in FIG. 6 is provided, the deliberate provision of this blank area can be used to induce a feeling of anticipation in the player: "I wonder what kind of mystery character is hidden there?" Alternatively, if there is no such blank area, the game could be set in such a manner that the selection of game characters increases suddenly, after a given period of time has elapsed. This makes it possible to keep the existence of new game characters secret, and also increases the impact felt by the player when a new game character appears.

Figure 7:
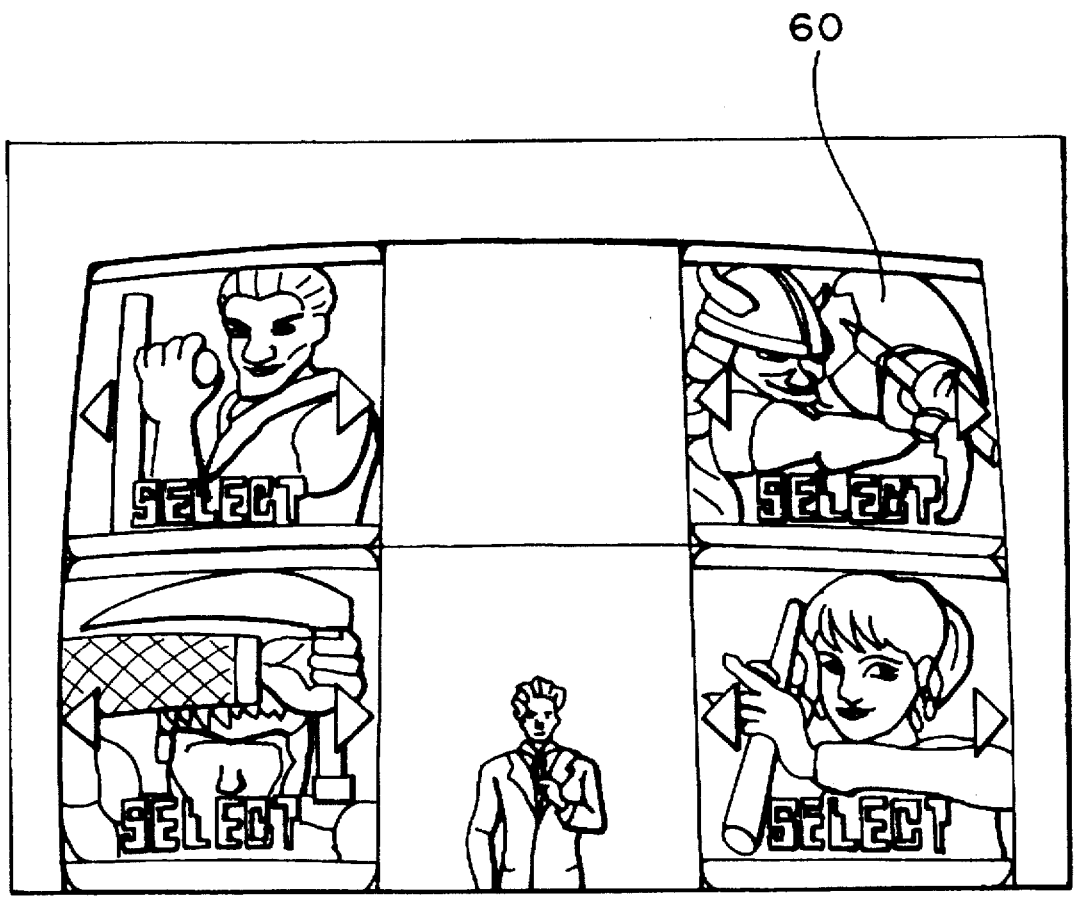
FIG. 7 shows a further example of a game image created by this embodiment.

When the number of times played N of the game exceeds the given number A (or when the total playing time T exceeds TA), a new game character appears in the character selection region 60, as shown in FIG. 7, thus changing the numbers and/or types of game characters that the player can select. This ensures that the games machine will remain a topic of interest for a long time after it is installed in the game center, preventing boredom with this games machine. In other words, players will learn from word-of-mouth that this games machine will provide a new game character for selection when the number of times played exceeds a given number. Therefore, players will play this game repeatedly, and encourage their friends to play it, to make this new game character appear. This makes it possible to increase the operation rate of that games machine.

The fascination of the game could be further increased by making it known that a newly arrived game character will have characteristic techniques that are different from those of other characters, enabling a further increase in the operation rate.

Displaying the current number of times played or total playing time on the game scene is also an effective method of increasing the operation rate. For example, the number of times played could be displayed as indicated by P in FIG. 2. Thus, if the number of times played N is close to exceeding the value A, players receive psychological encouragement to continue playing to see what happens when A is exceeded. Note that this number of times played or the total playing time could be displayed continuously on the game scene, or it could be displayed on the game scene only at given times, such as at the start or end of each bout. In addition, it could be displayed small enough that the player might not be able to see it clearly, or the number of times played or total playing time could be encoded.

Various other methods of modifying the information relating to the game characters that the player can select could be envisioned, such as a change in the form in which existing characters are displayed.

Updating of the game-setting information could also modify information relating to combat between game characters. This modification could be an addition to the skills (attack methods) exhibited by a game character when a parameter such as the number of times played reaches a given number. The fascination of the game can be further increased by making available a skill that has not been available until then, such as the ability to throw weapons from both hands. Such a characteristic technique can be produced by enabling the player to press combinations of the buttons 32, 34, 36 and 38 of FIG. 1, when the number of times played has exceeded a given number or the total playing time has exceeded a given length of time. These combinations can be displayed by means such as a board 43. This feature could be implemented by increasing the available characteristic techniques in a stepwise manner, every time the value X is exceeded in the step S7 of FIG. 4 or 5.

This updating of the game-setting information can also be used to change the way in which the background scenery is displayed, or the background music emitted from the speakers 40 and 42.

4. Modifying the Numbers and/or Types of Game Characters

Several methods can be considered for changing the numbers and/or types of game characters that players can select after a given period of time has elapsed. One method is to change the numbers and/or types of game characters after the number of times played has exceeded a given number or after the total playing time has exceeded a given length of time, as shown in FIGS. 4 and 5. Another method is to change the numbers and/or types of game characters after determining that a given period of time has elapsed, on the basis of the time during which the games machine has been on.

The modification of the numbers and/or types of game characters on the basis of the number-of-times-played information could be done as described below. First of all, the information updating section 104 of FIG. 8 updates the number-of-times-played information on the basis of the number of times played by the player. Assume that the average number of times played in one day is K and thus that one day has elapsed when this number of times played exceeds K. If it is also assumed that L days have elapsed when the number of times played reaches K×L, instructions to change the numbers and/or types of the game characters are given to a game character selection image setting section 154. The game character selection image setting section 154 changes the setting of the game character selection image in accordance with the instructions. More specifically, the image setting is modified in such a manner that a new game character appears in the character selection region 60 of FIG. 6. A game character selection image generation section 210 within the image synthesis section 200 generates this game character selection image in accordance with this image setting and displays it on the display 10.

Modification of the numbers and/or types of game characters on the basis of the total-playing-time information is done in a similar manner. In this case, it is assumed that one day has elapsed when the total playing time exceeds P hours. If it is also assumed that a given period of L days has elapsed when the total playing time reaches P×L, instructions to change the numbers and/or types of the game characters are given to the game character selection screen setting section 154.

The numbers and/or types of game characters can be modified on the basis of information on the time during which the games machine has been on, as described below. First of all, the time during which the games machine has been on is measured. This measurement can be done in the same manner as the measurement of the total playing time. In other words, instead of determining whether or not the game has ended in the step S3 of FIG. 5, the system could determine whether or not the power has been turned off. This determination is based on the detection result from the power detection section 110. Assume that the time during which the games machine has been on in a day is Q hours. At a public site such as a games center, the games machines are turned on when the site opens and are turned off when it closes. Therefore, the time during which the games machine is on during a day is substantially constant, so that there will be no great difference in practice between the actual operating time of the games machine and the assumption that the games machine is on for Q hours a day.

If the time during which the games machine is on is Q×L hours, it can be assumed that L days have elapsed, and the information updating section 104 sends the game character selection image setting section 154 instructions to change numbers and/or types of game characters. This enables the change of display shown in FIGS. 6 and 7.

Figure 9:
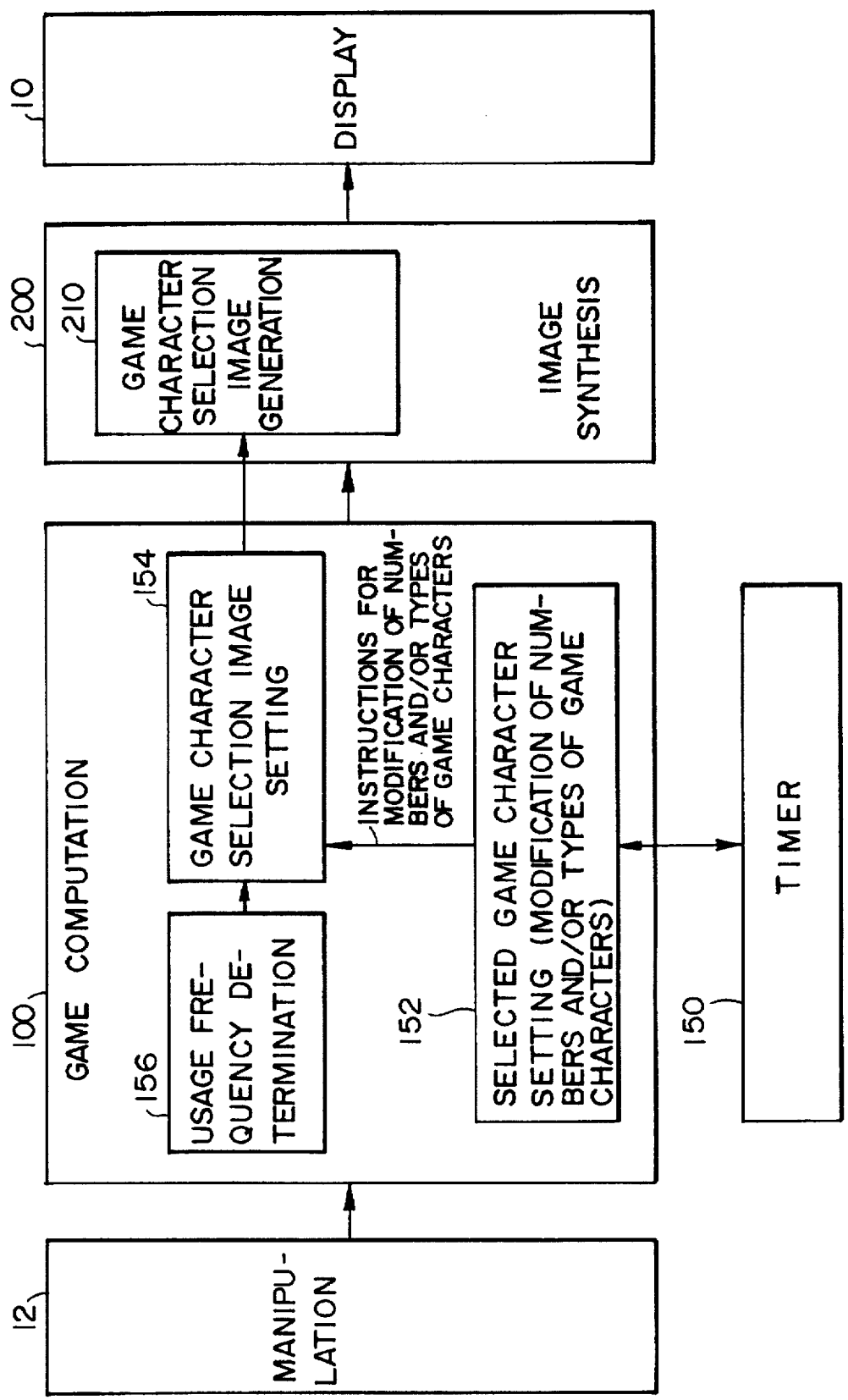
FIG. 9 is a block diagram illustrative of the operations when the number or type of game characters is changed by using a timer.

However, it is preferable that a timer 150 is provided as shown in FIG. 9, and the passage of time is measured thereby. In other words, when the time measurement of the timer 150 determines that a given period of time has elapsed, a selected game character setting section 152 sends the game character selection image setting section 154 instructions to change the numbers and/or types of game characters. The game character selection image generation section 210 then modifies the game selection image shown in FIG. 6 to that shown in FIG. 7. The timer 150 in this case is means such as a built-in crystal oscillator, and it has additional functions such as a calendar function. With a public games machine, the timer 150 is initialized at a suitable time such as when the games machine is shipped or installed, then the timer 150 uses an internal counter or the like to measure the passage of time since that initialization. Using a timer 150 in this manner makes it possible to specify the current time accurately as, for example, yy:mm:dd:hh:nn (where yy represents the last two digits of the current year; mm, the current month; dd, the current day; and hh:nn, the current time). Thus this method can set a given period of time more accurately than a method using the time during which the games machine has been on so that, for example, the numbers and/or types of game characters can be changed 60 days after the games machine is shipped. This accurate setting of the given period of time makes it possible to synchronize the arrival times of new game characters at different games centers at which this model of games machine is installed, to a certain extent.

Using the timer 150 also makes it possible to modify the numbers and/or types of game characters when a given point of time has been reached, such as on a date such as yy:mm:dd. This makes it possible to spread the word that "something will happen on yy:mm:dd," so that this announcement effect can further increase the popularity of this games machine. It also makes it possible to synchronize the arrival times of new game characters at different games centers more accurately.

5. Order of Appearance of New Game Characters

Figure 10:
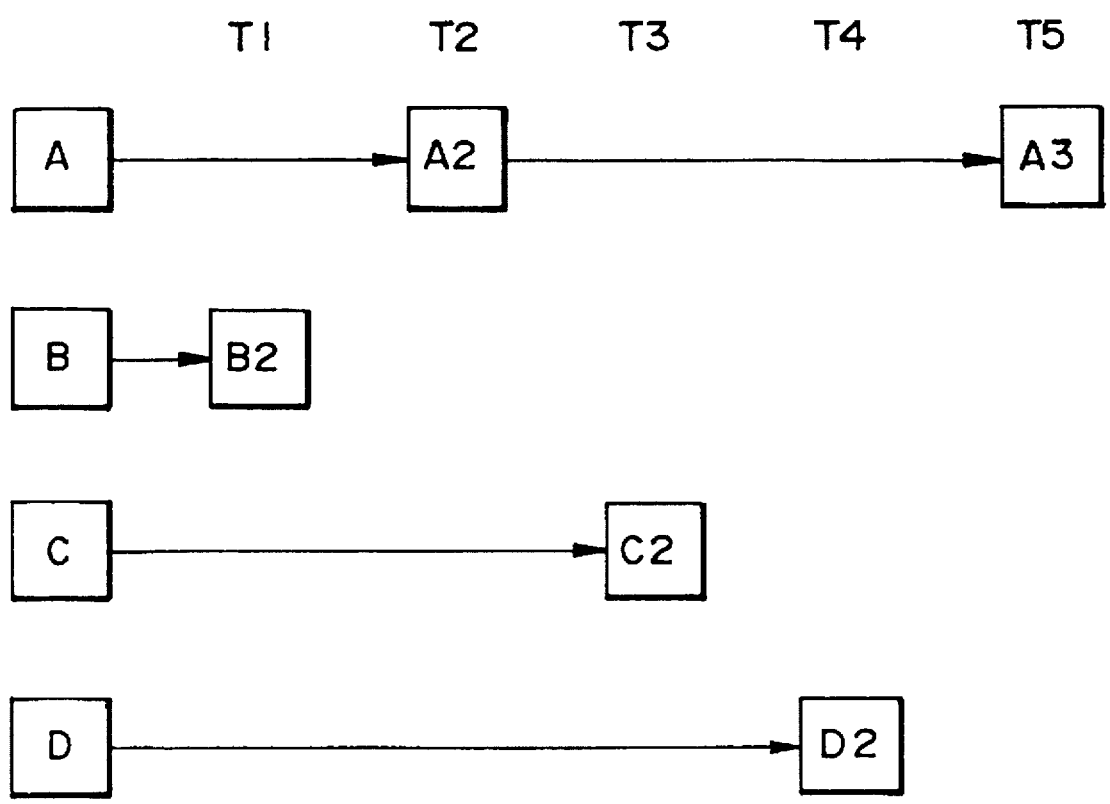
FIG. 10 is a diagram illustrative of the order of appearance of game characters.

One technical concern relating to this games machine is the sequence in which new game characters appear when there are a plurality of new game characters. For example, when the games machine is initialized, there could be four game characters A, B, C, and D, as shown in FIG. 10. After a given period of time T1 has elapsed, a new game character B2 appears, ready to be selected. In this case, the new game character B2 corresponds to an existing game character B. The new game character B2 differs from the existing game character B in some way, in that he has a different type of skill or speed (generally speaking, this is a new fighting technique or faster speed). In other words, the game character B2 reacts in a slightly different manner in response to the game manipulations of the player. FIG. 10 also shows how characters A2, C2, D2, and A3 appear in sequence as each of given periods of time T2, T3, T4, and T5 elapses. In FIG. 10, the characters are set to appear in an order of appearance of B2, A2, C2, D2, then A3. The sequence in which the new game characters appears is determined on the basis of the frequency with which the existing games characters were selected. This usage frequency is determined by a usage frequency determination section 156 shown in FIGS. 8 and 9. In other words, B2 is set to be the first new character to appear in FIG. 10 because B was the most frequently used character. Zt is considered that the most frequently selected game character is the one that is most liked by a large number of players. Therefore, it is preferable that the priority with which a new game character appears corresponds to the number of times that existing game characters are used, to confirm to the wishes of the majority of players. Conversely, the sequence could be such that a new game character appears in order to replace the existing game character that has the lowest usage frequency. A game character with a low usage frequency has lost his competitive edge and thus should be changed into a new game character, to increase his power and make the attractions of the array of game characters more uniform.

Note that the game character A3 in FIG. 10 corresponds to game characters A and A2. The priority given to the appearance of A3 could be determined on the basis of the usage frequencies of the characters A2 to D2, or on the basis of the usage frequencies of the characters A to D and A2 to D2.

When a new game character has appeared, such as B2 FIG. 10, the previous game character B could be displayed as before on the game character selection screen, or it could be removed therefrom. If it is decided to display this previous game character B, the selection range available to the player can thus be made more interesting by increasing the number of game characters that the player can select. This makes it possible for a certain player to go one using a favorite existing game character, even after a new character has appeared. Therefore, leaving the existing game character ready for selection enables the implementation of a games machine that better follows the players' wishes. Conversely, if the previous game character is not displayed, and a new game character having actions in response to the game manipulations that are partially different is displayed instead, the processing load on the games machine can be reduced. Note that a new game character need not be related to an existing game character as exemplified by the game characters B and B2 in FIG. 10; the new game character could be completely unrelated to the existing game characters.

Figure 11A:
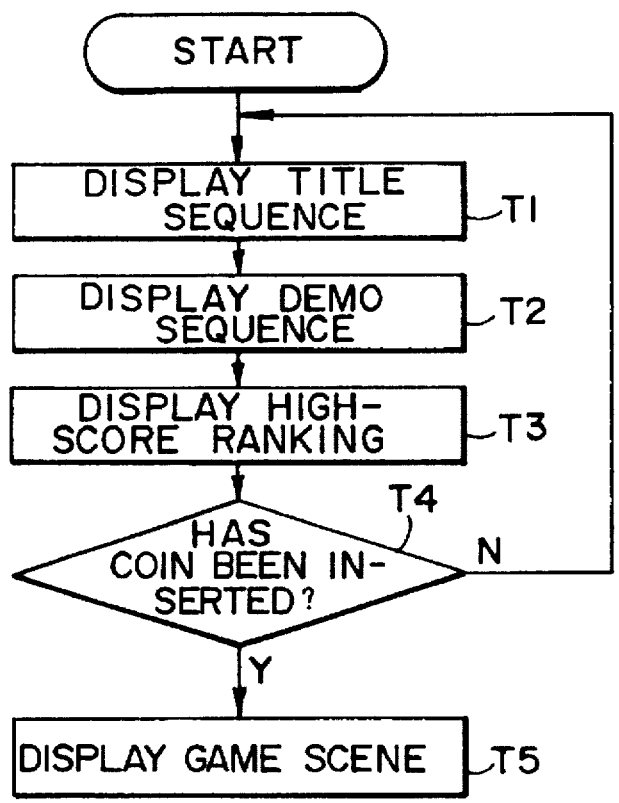
FIGS. 11A and 11B are a flowchart and view illustrative of the display of identification information during a period in which the game is not being played.
Figure 11B:
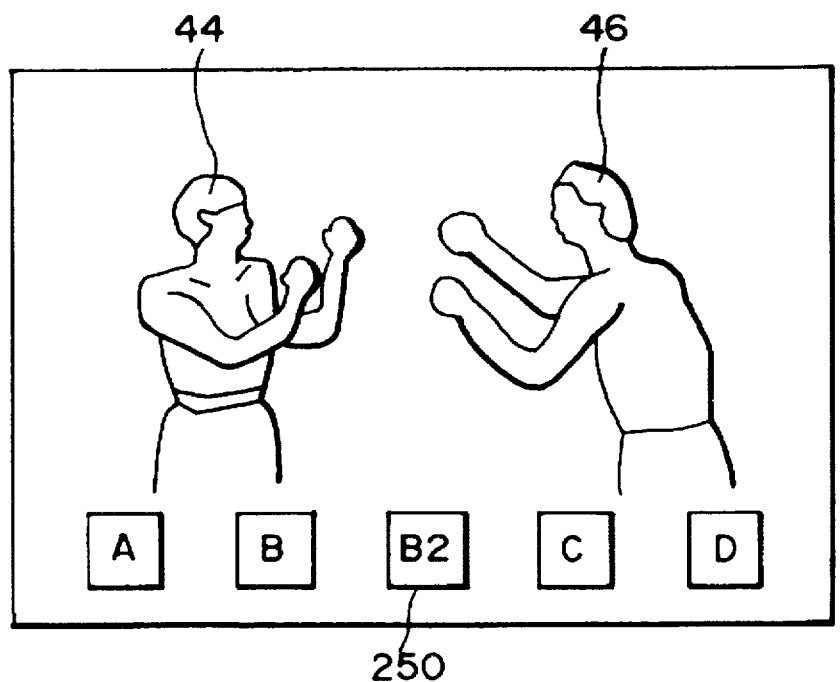

6. Display of Identification Information for New Game Character in Title Sequence It is common for a games machine of this type to display a generic scene such as a demo sequence when no-one is playing the game. As shown in the flowchart of FIG. 11A, the games machine repeatedly displays images such as a title sequence, a demo sequence, and a high-score ranking (steps T1 to T3) until a player inserts a coin (step T4). The actual game scene is not displayed until a player has inserted a coin (step T5). In such a games machine, information for identifying a new game character is displayed on the screen during the periods of time in which no-one is playing the game. For example, information identifying the new game character B2 is displayed while the demo sequence is running, as shown by reference number 250 in FIG. 11B. This identification information could include details such as the face, form, name, and number of the game character. With this games machine, a game character that is fighting in the demo sequence could be modified to become the new games machine. For example, FIG. 11B shows a demo sequence in which the game characters 44 and 46 are fighting each other, but in this case the game character 46 could be modified to become the new game character B2. This enables players to recognize that a new game character has appeared on this games machine, as if the games machine has been upgraded, which is a simple way of increasing the operation rate again in a games machine that has become boring to players.

Note that the identification information could be displayed on the title sequence or high-score ranking scene, not just on the demo sequence. Different methods could be considered for displaying it on the title sequence, such as the display of different titles. Similarly, different methods could be considered for displaying it on the high-score screen, such as displaying details such as the face, form, name, and number of the new game character in the field for the names of players who have used the new game character and have achieved high scores.

Figure 12:
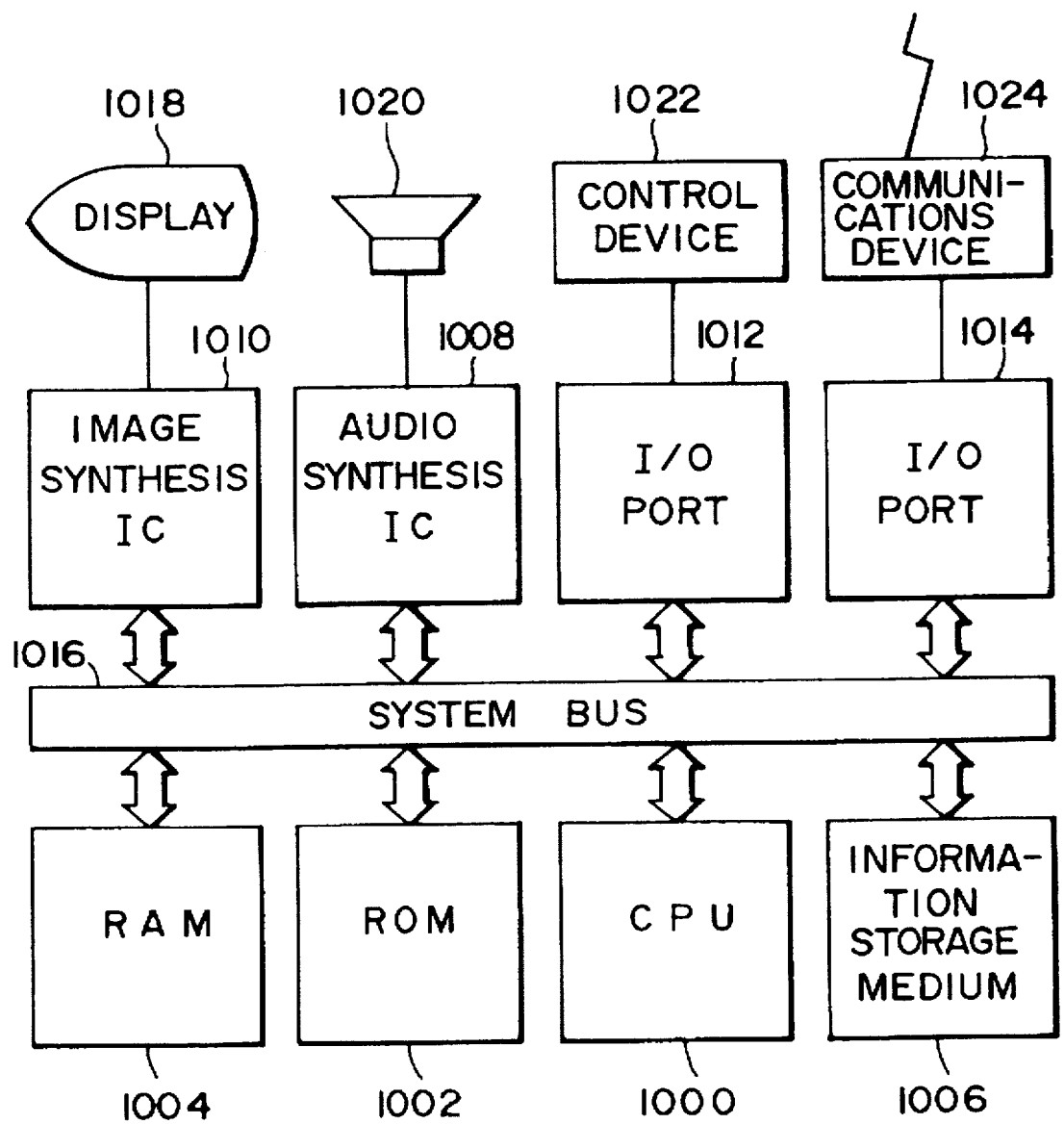
FIG. 12 shows an example of hardware that implements this embodiment of the invention.
Figure 13A:
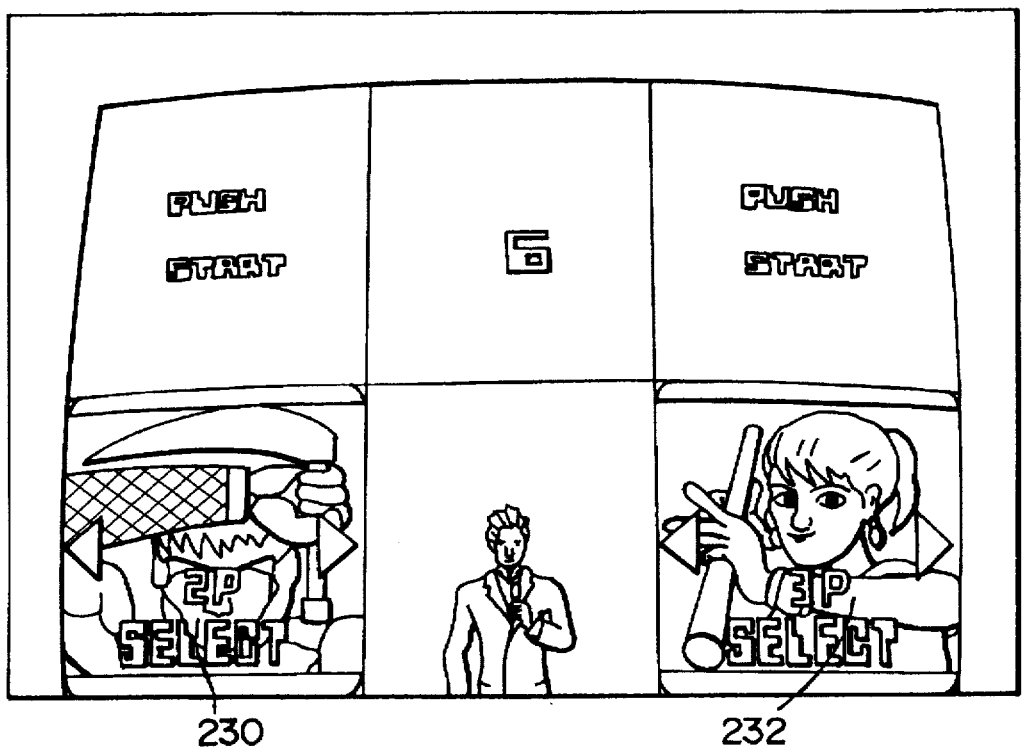
FIGS. 13A and 13B show examples of game images created by a prior-art games machine.
Figure 13B:
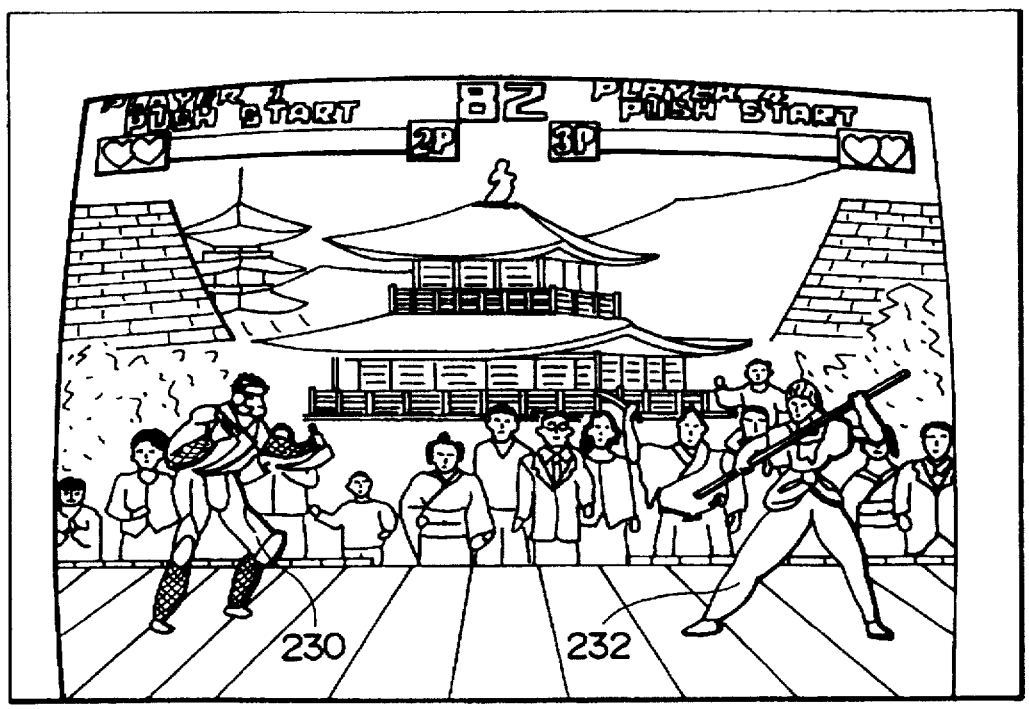

An example of hardware that implements the games machine of this embodiment is shown in FIG. 12. The games machine shown in this figure comprises a CPU 1000, ROM 1002, RAM 1004, an information storage medium 1006, an audio synthesis IC 1008, an image synthesis IC 1010, and I/O ports 1012 and 1014 that are all mutually connected by a system bus 1016 in such a manner that data can be transferred therebetween. A display 1018 is connected to the image synthesis IC 1010, a speaker 1020 is connected to the audio synthesis IC 1008, a control device 1022 is connected to the I/O port 1012, and a communications device 1024 is connected to the I/O port 1014.

The information storage medium 1006 is mainly used to store data such as a game program and image information representing display objects, and a CD-ROM, game cassette, IC card, magneto-optical disk, or floppy disk could be used therefor. The ROM 1002 stores initialization information for the main unit of the games machine. It should be noted, however, that data such as the game program and image information could be stored in the ROM 1002 in a games machine that does not use the information storage medium 1006.

The control device 1022 is designed to obtain results obtained as the player plays the game and input them to the main unit of the games machine, and could be a pad type of device that is commonly used with domestic games machines, or a control panel type of device that is commonly used with public games machines.

The CPU 1000 controls the entire games machine in accordance with a game program stored in the information storage medium 1006, a system program stored in the ROM 1002, and signals that are input by the control device 1022, and process related data. The RAM 1004 is a storage means that is used as a work space for the CPU 1000. It also stores given data from the information storage medium 1006 and the ROM 1002, or computation results from the CPU 1000.

This type of games machine is also designed to output sounds and images provided by the audio synthesis IC 1008 and the image synthesis IC 1010, as appropriate. The audio synthesis IC 1008 creates sounds such as special effects and game music on the basis of information stored in the information storage medium 1006 ROM 1002, and outputs those sounds by means of the speaker 1020. Similarly, the image synthesis IC 1010 creates pixel information based on image information transferred from the RAM 1004, the ROM 1002, and the information storage medium 1006, for output on the display 1018. Note that a device called a head-mounted display (HMD) could be used as the display 1018.

The communications device 1024 sends to and receives from the outside the various items of information used within the games machine. It is used to send to or receive from other games machines connected thereto given information relating to the game program and send or receive information such as the game program via a communications circuit.

Figure 8:
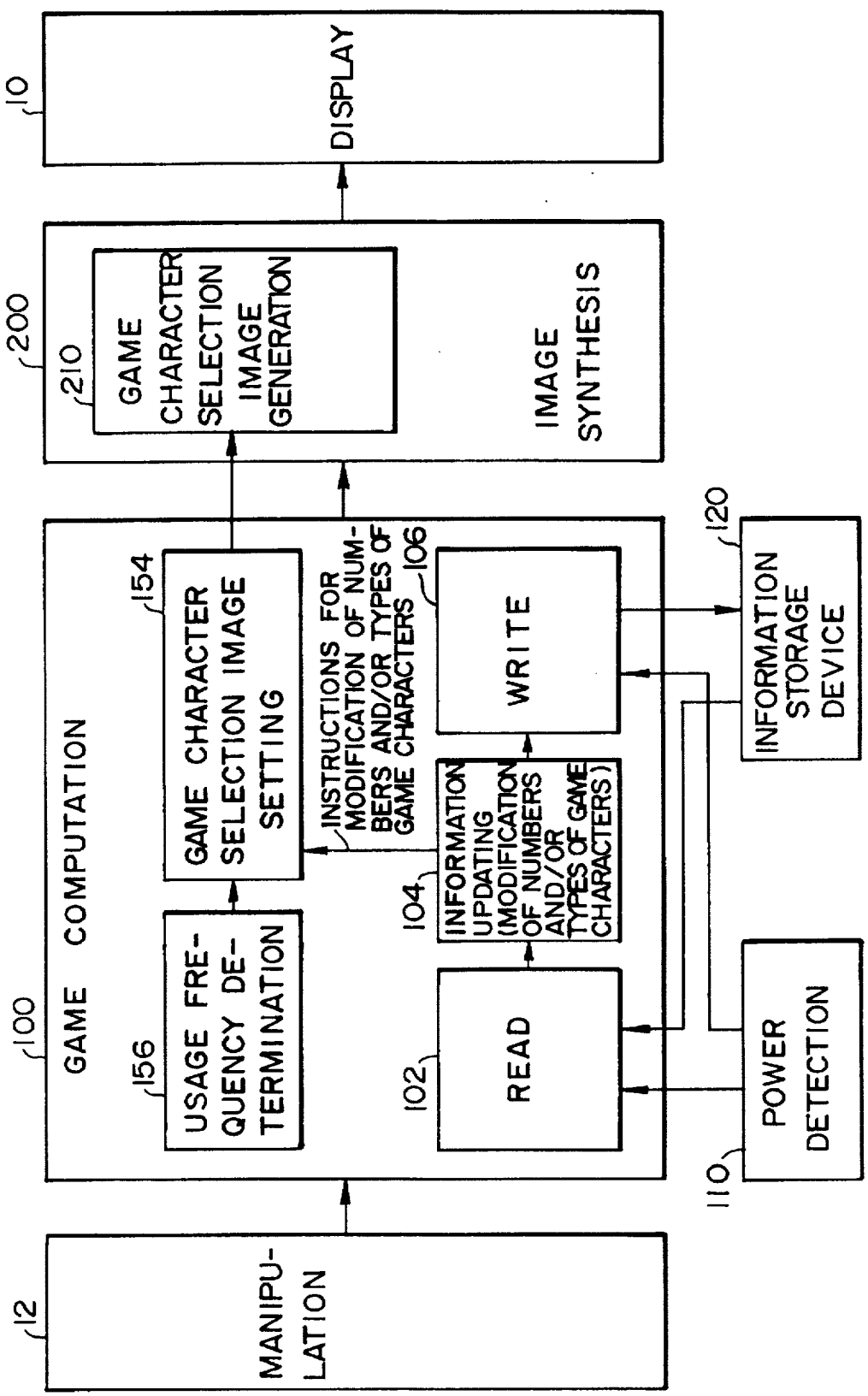

The processing performed by components such as the game computation section 100, the image synthesis section 200, the read section 102, the information updating section 104, the write section 106, the selected game character setting section 152, the game character selection image setting section 154, and the usage frequency determination section 156 shown in FIGS. 1, 8, and 9 is implemented by the information storage medium 1006 in which is stored the software (program code means) for processing the flow shown in the flowchart of FIG. 4 or 5, and the CPU 1000 and image synthesis IC operating in accordance with this software. Note that the processing handled by components such as the image synthesis IC 1010 could equally well be handled in a software manner by the CPU 1000 or a general-purpose digital signal processor (DSP).

It should be noted that the present invention is not limited to the embodiment described above; various modifications can be made within the scope of the invention.

For example, this embodiment was described by way of example as being applied to a combat type of game in which one game character battles another game character, but this invention can equally well be applied to a combat games machine in which moving bodies such as robots, tanks, or fighter planes fight one another. This invention can also be applied to games machines that are not combat games machines.

This embodiment was described as being used to modify details such as the game scene by updating game-setting information, but the present invention is not limited thereto; it can equally well be applied to modifying the settings of a game in other ways.

In addition, information that is equivalent to number-of-times-played information or total-playing-time information could be used for updating the game-setting information.

This invention is similarly not limited to a three-dimensional games machine and can equally well be applied to a two-dimensional games machine. The embodiment of this invention described above concerned a combat game in which one human being competes against another, but it can also be applied to a games machine where one human being competes against a computer, or a combat type of games machine involving three or more players. This invention can also be applied to a domestic games machine, not just to a public games machine. It can be applied to a games machine for a large-scale attraction where a large number of players can participate.

It should be noted, however, that this invention will be particularly effective when applied to a public games machine. One method of modifying the numbers and/or types of the game characters or moving bodies is to implement such a modification when a player has advanced a given number of game stages. However, a new game character will not appear with this method until one player has played the game continuously for a long time. Since it is virtually impossible for one player to continue playing on a public games machine for a long time, this method would make it difficult for a new game character to appear. In contrast thereto, the present invention makes a new game character appear when a given period of time has elapsed or a given point of time has been reached, so that a new game character can be made to appear easily in a public games machine. Since this invention makes it so easy to control the timing at which a new game character appears, the appearance of such a new game character can be set to be at about the time that players start to get bored with the games machine, and thus it is possible to increase the operation rate, which is particularly required of a public games machine.

The computations performed by components such as the game computation means and image synthesis means of this invention could equally well be done by a dedicated image processing device or by software using a general-purpose microprocessor or DSP.

It should be noted that the computations performed by the game computation means and image synthesis means are not limited to those mentioned in the above description of the embodiment of this invention.

What is claimed is:

1. A games machine comprising:

an information storage device for storing information comprising at least number-of-times-played information and game-setting information for a game, said information being retained after power is turned off;

manipulation means for enabling a player to interact with said game;

game computation means for performing game computations based on manipulation information from said manipulation means, said game-setting information stored in said information storage device, and a given program; and image synthesis means for synthesizing an image that can be seen by said player based on game computations of said game computation means;

wherein said game computation means comprises:

means for reading said information from said information storage device;

information updating means for updating said number-of-times-played information every time said game is played and updating said game-setting information when number of times played exceeds a given number, wherein at least one characteristic about said game is changed by updating said game-setting information; and means for storing the updated information in said information storage device.

2. The games machine as defined in claim 1, wherein said game computation means performs game computations for implementing combat between a game character or moving body being manipulated by said player and at least one other game character or moving body being manipulated by another player or a computer, and at least one characteristic about the game character or moving body selectable by said player is changed by updating said game-setting information.

3. The games machine as defined in claim 1, wherein said game computation means performs game computations for implementing combat between a game character or moving body being manipulated by said player and at least one other game character or moving body being manipulated by another player or a computer, and at least one characteristic of said combat between said game characters or moving bodies is changed by updating said game-setting information.

4. The games machine as defined in claim 1, wherein said number-of-times played information is displayed on a game screen for a given period of time or displayed continuously.

5. A games machine comprising:

an information storage device for storing information comprising at least total-playing-time information and game-setting information for a game, said information being retained after power is turned off;

manipulation means for enabling a player to interact with said game;

game computation means for performing game computations based on manipulation information from said manipulation means, said game-setting information stored in said information storage device, and a given program; and image synthesis means for synthesizing an image that can be seen by said player, based on game computations by said game computation means;

wherein said game computation means comprises:

means for reading said information from said information storage device;

information updating means for updating said total-playing-time information every time said game is played and updating said game-setting information when total playing time exceeds a given length of time; and means for storing the updated information in said information storage device.

6. The games machine as defined in claim 5, wherein said game computation means performs game computations for implementing combat between a game character or moving body being manipulated by said player and at least one other game character or moving body being manipulated by another player or a computer, and at least one characteristic about the game character or moving body selectable by said player is changed by updating said game-setting information.

7. The games machine as defined in claim 5, wherein said game computation means performs game computations for implementing combat between a game character or moving body being manipulated by said player and at least one other game character or moving body being manipulated by another player or a computer, and at least one characteristic of said combat between said game characters or moving bodies is changed by updating said game-setting information.

8. The games machine as defined in claim 5, wherein said total-playing-time information is displayed on a game screen for a given period of time or displayed continuously.

9. A games machine comprising:

manipulation means for enabling a player to interact with a game;

game computation means for performing game computations for implementing combat, between a game character or moving body being manipulated by said player and at least one other game character or moving body being manipulated by another player or a computer, based on at least manipulation information from said manipulation means and a given program;

image synthesis means for synthesizing an image that can be seen by said player based on game computation of said game computation means; and means for increasing the number of game characters or moving bodies selectable by said player when a given period of time has elapsed.

10. The games machine as defined in claim 9, wherein a priority of appearance of a new game character or moving body that appears as a result of increasing the number of game characters or moving bodies is based on a usage frequency of an existing game character or existing moving body that corresponds to said new game character or new moving body.

11. The games machine as defined in claim 4, wherein information for identifying a new game character or new moving body that has appeared as a result of increasing the number of game characters or moving bodies is displayed during a period which no player is playing said game.

12. A games machine comprising:
    manipulation means for enabling a player to interact with a game;
    game computation means for performing game computations for implementing combat, between a game character or moving body being manipulated by said player and at least one other game character or moving body being manipulated by another player or a computer, based on at least manipulation information from said manipulation means and a given program;
    image synthesis means for synthesizing an image that can be seen by said player based on game computation of said game computation means; and
    means for changing at least one of the game characters or moving bodies selectable by said player when a given period of time has elapsed, wherein said at least one changed game character or moving body has at least one characteristic that is at least partially different from the at least one characteristic of said at least one game character or moving body.

13. The games machine as defined in claim 12, wherein a priority of appearance of a new game character or moving body that appears as a result of changing a game character or moving body is based on a usage frequency of an existing game character or existing moving body that corresponds to said new game character or new moving body.

14. The games machine as defined in claim 12, wherein information for identifying a new game character or new moving body that has appeared as a result of changing a game character or moving body is displayed during a period which no player is playing said game.

15. A games machine comprising:
    manipulation means for enabling a player to interact with a game;
    game computation means for performing game computations for implementing combat, between a game character or moving body being manipulated by said player and at least one other game character or moving body being manipulated by another player or a computer, based on at least manipulation information from said manipulation means and a given program;
    image synthesis means for synthesizing a game image that can be seen by said player based on game computations; of said game computation means;
    timer means for measuring the passage of time; and
    means for increasing the number of game characters or moving bodies selectable by said player when elapse of a given period of time or arrival at a given point of time is measured by said timer means.

16. The games machine as defined in claim 15, wherein a priority of appearance of a new game character or moving body that appears as a result of increasing the number of game characters or moving bodies is based on a usage frequency of an existing game character or existing moving body that corresponds to said new game character or new moving body.

17. The games machine as defined in claim 15, wherein information for identifying a new game character or new moving body that has appeared as a result of increasing the number of game characters or moving bodies is displayed during a period which no player is playing said game.

18. A games machine comprising:
    manipulation means for enabling a player to interact with a game;
    game computation means for performing game computations for implementing combat, between a game character or moving body being manipulated by said player and at least one other game character or moving body being manipulated by another player or a computer, based on at least manipulation information from said manipulation means and a given program;
    image synthesis means for synthesizing a game image that can be seen by said player based on game computations of said game computation means;
    timer means for measuring the passage of time; and
    means for changing at least one of the game characters or moving bodies selectable by said player when elapse of a given period of time or arrival at a given point of time is measured by said timer means, wherein said at least one changed game character or moving body has at least one characteristic that is at least partially different from the at least one characteristic of said at least one game character or moving body.

19. The games machine as defined in claim 18, wherein a priority of appearance of a new game character or moving body that appears as a result of changing a game character or moving body is based on a usage frequency of an existing game character or existing moving body that corresponds to said new game character or new moving body.

20. The games machine as defined in claim 18, wherein information for identifying a new game character or new moving body that has appeared as a result of changing a game character or moving body is displayed during a period which no player is playing said game.

21. A method of synthesizing an image based on game-setting information which is stored in an information storage device together with at least number-of-times-played information for a game, said image synthesis method comprising:
    performing game computations based on game manipulations performed by a player, game-setting information and a given program;
    synthesizing an image that can be seen by said player based on said game computations;
    reading information from said information storage device;
    updating said number-of-times-played information every time said game is played and updating said game-setting information when the total number of times played exceeds a given number, wherein at least one characteristic about said game is changed by updating said game-setting information;
    storing updated information in said information storage device; and
    retaining said updated information even after power is turned off.

22. A method of synthesizing an image based on game-setting information which is stored in an information storage device together with at least total-playing-time information for a game, said image synthesis method comprising:
    performing game computations based on game manipulations performed by a player, said game-setting information and a given program;
    synthesizing an image that can be seen by said player based on said game computations;
    reading information from said information storage device;
    updating said total-playing-time information every time said game is played and updating said game-setting information when the total playing time exceeds a given length of time;
    storing updated information in said information storage device; and
    retaining said updated information even after power is turned off.

23. A method of synthesizing an image, comprising:

performing computations for a game that implements combat, between a game character or moving body being manipulated by a player and at least one other game character or moving body being manipulated by another player, or a computer, based on a given program and game manipulations performed by said player;

synthesizing an image that can be seen by said player based on game computations; and increasing the number of game characters or moving bodies selectable by said player when a given period of time has elapsed.

24. A method of synthesizing an image, comprising:

performing computations for a game that implements combat, between a game character or moving body being manipulated by a player and at least one other game character or moving body being manipulated by another player or a computer, based on a given program and game manipulations performed by said player;

synthesizing an image that can be seen by said player based on game computations; and changing at least one of the game characters or moving bodies selectable by said player when a given period of time has elapsed, wherein said at least one changed game character or moving body has at least one characteristic that is at least partially different from the at least one characteristic of said at least one game character or moving body.

25. A method of synthesizing an image, comprising:

performing computations for a game that implements combat, between a game character or moving body being manipulated by a player and at least one other game character or moving body being manipulated by another player or a computer, based on a given program and game manipulations performed by said player;

synthesizing an image that can be seen by said player based on game computations;

measuring the passage of time; and increasing the number of game characters or moving bodies selectable by said player when elapse of a given period of time or arrival at a given point of time is measured.

26. A method of synthesizing an image, comprising:

performing computations for a game that implements combat, between a game character or moving body being manipulated by a player and at least one other game character or moving body being manipulated by another player or a computer, based on a given program and game manipulations performed by said player;

synthesizing an image that can be seen by said player based on game computations;

measuring the passage of time; and changing at least one of the game characters or moving bodies selectable by said player when elapse of a given period of time or arrival at a given point of time is measured, wherein said at least one changed game character or moving body has at least one characteristic that is at least partially different from the at least one characteristic of said at least one game character or moving body.

27. An information storage medium comprising:

first computer readable program code means for processing game computations that implement combat between a game character or moving body being manipulated by a player and at least one other game character or moving body being manipulated by another player or a computer;

second computer readable program code means for synthesizing a game image that can be seen by said player based on game computations; and third computer readable program code means for increasing the number of game characters or moving bodies selectable by said player when a given period of time has elapsed.

28. The information storage medium as defined in claim 27, wherein a priority of appearance of a new game character or moving body that appears as a result of increasing the number of game characters or moving bodies is based on a usage frequency of an existing game character or existing moving body that corresponds to said new game character or new moving body.

29. The information storage medium as defined in claim 27, wherein information for identifying a new game character or new moving body that has appeared as a result of increasing the number of game characters or moving bodies is displayed during a period which no player is playing said game.

30. An information storage medium comprising:

first computer readable program code means for processing game computations that implement combat between a game character or moving body being manipulated by a player and at least one other game character or moving body being manipulated by another player or a computer;

second computer readable program code means for synthesizing a game image that can be seen by said player based on game computations; and third computer readable program code means for changing at least one of the game characters or moving bodies selectable by said player when a given period of time has elapsed, wherein said at least one changed game character or moving body has at least one characteristic that is at least partially different from the at least one characteristic of said at least one game character or moving body.

31. The information storage medium as defined in claim 30, wherein a priority of appearance of a new game character or moving body that appears as a result of increasing the number of game characters or moving bodies is based on a usage frequency of an existing game character or existing moving body that corresponds to said new game character or new moving body.

32. The information storage medium as defined in claim 30, wherein information for identifying a new game character or new moving body that has appeared as a result of increasing the number of game characters or moving bodies is displayed during a period which no player is playing said game.

33. An information storage medium comprising:

first computer readable program code means for processing game computations that implement combat between a game character or moving body being manipulated by a player and at least one other game character or moving body being manipulated by another player or a computer;

second computer readable program code means for synthesizing a game image that can be seen by said player, based on game computations;

third computer readable program code means for processing a time measurement; and fourth computer readable program code means for increasing the number of game characters or moving bodies selectable by said player when elapse of a given period of time or arrival at a given point of time is measured.

34. The information storage medium as defined in claim 33, wherein a priority of appearance of a new game character or moving body that appears as a result of increasing the number of game characters or moving bodies is based on a usage frequency of an existing game character or existing moving body that corresponds to said new game character or new moving body.

35. The information storage medium as defined in claim 33, wherein information for identifying a new game character or new moving body that has appeared as a result of increasing the number of game characters or moving bodies is displayed during a period which no player is playing said game.

36. An information storage medium comprising:

first computer readable program code means for processing game computations that implement combat between a game character or moving body being manipulated by a player and at least one other game character or moving body being manipulated by another player or a computer;

second computer readable program code means for synthesizing a game image that can be seen by said player, based on game computations;

third computer readable program code means for processing a time measurement; and fourth computer readable program code means for changing at least one of the game characters or moving bodies selectable by said player when elapse of a given period of time or arrival at a given point of time is measured, wherein said at least one changed game character or moving body has at least one characteristic that is at least partially different from the at least one characteristic of said at least one game character or moving body.

37. The information storage medium as defined in claim 36, wherein a priority of appearance of a new game character or moving body that appears as a result of increasing the number of game characters or moving bodies is based on a usage frequency of an existing game character or existing moving body that corresponds to said new game character or new moving body.

38. The information storage medium as defined in claim 36, wherein information for identifying a new game character or new moving body that has appeared as a result of increasing the number of game characters or moving bodies is displayed during a period which no player is playing said game.

* * * * *